United States Patent [19]

McMullen et al.

[11] 4,089,753

[45] May 16, 1978

[54] PROCESS FOR THE PRODUCTION OF NICKEL CLAD STEEL COINAGE BLANK

[75] Inventors: Arthur G. McMullen, Edmonton; Michael J. H. Ruscoe, St. Albert; Maurice A. Clegg; Ronald L. Prowse, both of Fort Saskatchewan, all of Canada

[73] Assignee: Sherritt Gordon Mines Limited, Toronto, Canada

[21] Appl. No.: 742,820

[22] Filed: Nov. 18, 1976

Related U.S. Application Data

[60] Continuation-in-part of Ser. No. 637,800, Dec. 4, 1975, abandoned, which is a division of Ser. No. 516,248, Oct. 21, 1974, Pat. No. 3,940,254.

[30] Foreign Application Priority Data

Sep. 16, 1974 Canada .................................. 209325

[51] Int. Cl.² .................... C25D 7/00; C25D 5/50; C25D 17/20
[52] U.S. Cl. .................................... 204/23; 204/37 R
[58] Field of Search ................ 204/23, 25, 213, 37 R

[56] References Cited

U.S. PATENT DOCUMENTS

| 688,857 | 12/1901 | Johnson | 204/23 |
| 2,731,403 | 1/1956 | Rubin | 204/37 R |
| 3,344,817 | 10/1967 | Connard | 204/213 |

OTHER PUBLICATIONS

Metal Finishing Guide Book Directory for 1974, 42nd Edition, pp. 356–359, 461–477.

*Primary Examiner*—T. M. Tufariello
*Attorney, Agent, or Firm*—Robert F. Delbridge; Arne I. Fors

[57] ABSTRACT

A process for the production of coin blanks suitable for minting into coins includes providing metallic core pieces, each core piece having opposed, substantially planar faces and a common side edge. The core pieces are loaded into a perforated container which is placed in an electroplating bath. A metallic cladding is placed on the core pieces, while moving the container angularly about a horizontal axis, until the metallic cladding has a thickness of at least about 0.05 mm on each face of each core piece and a thickness of at least 2 to 4 times the face thickness on the side edge of each core.

6 Claims, No Drawings

PROCESS FOR THE PRODUCTION OF NICKEL CLAD STEEL COINAGE BLANK

This application is a continuation-in-part of Application Ser. No. 637,800 filed Dec. 4, 1975 (now abandoned), which is a divisional of U.S. application Ser. No. 516,248, filed Oct. 21, 1974, now U.S. Pat. No. 3,940,254, issued Feb. 24, 1976.

This invention relates to the production of coin blanks, that is to say blanks suitable for minting into coins.

Owing to the continuously increasing cost of certain metals, it has now become well known to make coins from more than one material. Accordingly, present day coins frequently have a core made of one material which is relatively inexpensive, with at least the faces of the coin being of another material which provides a desired finish, the materials being metals or metal alloys. Until now, the only process used commercially to any extent for producing such composite coins involves rolling strips of metal or metal alloy into a composite sheet or sandwich, which may then be annealed. Coin blanks are then stamped out of the composite sheet.

One of the disadvantages of this known process is that the core material is visible around the edge of the coin. Besides detracting from the appearance of the coin, the exposure of this portion of the core to the atmosphere makes it susceptible to corrosion, which of course further detracts from the appearance of the coin as well as causing physical deterioration. Various attempts have been made to develop processes which can be used to produce composite coins without the core material being visible around the side edge but, so far as applicants are aware, no such process has previously been developed which is satisfactory on a commercial scale.

Applicants have now found that it is possible to produce composite coins on a commercial scale by a process including an electroplating step in which a multitude of metallic core pieces are loaded into a perforated cylindrical container, which is placed into a suitable electroplating bath, with a cathode in electrical contact with the core pieces. An electroplating operation is then carried out while moving the container angularly about a horizontal axis in the bath until at least about 0.05 mm of metal has been deposited on each face of each core piece and a thickness of at least 2 to 4 times the face thickness has been deposited on the side edge of each coin piece.

Apparatus of the kind suitable for carrying out the invention has been known for many years, and is commonly referred to as barrel plating apparatus. However, such apparatus has, in the past, been used only for plating operations in which only a very thin plating thickness is required and in which there has been no necessity for the thickness of the plated coating to be accurately controlled. Until now, it would not have been expected that metal core pieces could have been plated in such apparatus to a thickness of the magnitude and consistency required for coin blanks.

Most coins have raised rims around the edges of the faces to protect the faces from wear and also to facilitate stacking. In accordance with the present invention, such rims are advantageously produced on the core pieces before the electroplating step.

After electroplating, the plated or cladded core pieces may be heated to produce a metallurgical bond between the metallic cladding and the core piece of each cladded core piece. The heating may also be such as to produce a decrease in hardness of each cladded core piece to facilitate subsequent minting. For minting, the hardness of a cladded core piece is preferably less than about 65 on the Rockwell 30T hardness scale.

The metal cladding may be of nickel, and in this case the electroplating bath may be a nickel sulphamate bath. The core pieces may be of low carbon steel, and for ease of minting the carbon content of the steel is preferably less than about 0.08% by weight carbon. An even lower carbon content, for example less than 0.01% carbon, may be even more desirable.

In accordance with one embodiment of the invention, a strip of low carbon steel is rolled to an appropriate thickness, and core pieces of appropriate size are then stamped out of the strip. At this stage, raised rims are produced around the edges of the faces of the core pieces.

A multitude of core pieces, namely several hundred core pieces, are loaded into a perforated container of a barrel plating apparatus. After loading, the container is lowered into various cleaning baths to thoroughly clean the core pieces for the subsequent electroplating operation. In each cleaning bath, the container is rotated angularly about its horizontal axis to cause adequate contact between the cleaning fluid and the core pieces.

After the cleaning operation, the container is placed in an electroplating bath of nickel sulphamate solution. Flexible cathode rods are mounted internally of the container in contact with the core pieces, and baskets containing nickel anode pieces are loaded into the nickel sulphamate solution externally of the container. The anode baskets and cathode rods are connected to a D.C. source, the voltage of which will usually be in the range of from about 5 to 20 volts.

During electroplating, the container is rotated at a relatively low speed, for example around 6 r.p.m. so as to ensure that electric current passes through each core piece for substantially the same amount of time. The electroplating operation is continued until at least 0.05 mm of nickel has been deposited on each face of each core piece. This will usually take a considerable number of hours. The ratio of nickel thickness on each face of the core piece to the nickel thickness on the side edge of the core piece is determined primarily by the ratio of the diameter of a core piece to the diameter of the container. When the container is of such a size that several hundred core pieces can be loaded into the container without overloading to such an extent that movement of the core pieces during rotation of the container is unduly limited, the face to edge thickness ratio will be in the range 1:2 to 1:4.

After electroplating, the container is removed from the electroplating bath, and preferably placed in one or more washing baths to wash the nickel plated core pieces.

The nickel plated core pieces are removed from the container, and subsequently annealed to cause atomic interdiffusion of metals at the interface between the nickel and the core piece to form a metallurgical bond. The annealing also decreases the hardness of the nickel clad core pieces to less than 65 on the Rockwell 30T hardness scale, and preferably less than 45. Such annealing may be carried out in a furnace at a temperature of from about 800° to 1000° C for about 10 to 40 minutes under a reducing atmosphere, for example a hydrogen atmosphere.

Following annealing, the nickel clad core pieces may be burnished to give their surfaces a uniform finish of good appearance suitable for minting. The nickel clad core pieces are then finished coin blanks and merely require minting.

A specific example of the previously described embodiment will now be given.

About 600 coin-shaped steel core pieces having a carbon content of about 0.01 weight percent were loaded into a perforated cylindrical plating barrel of polypropylene, the barrel being 30 centimeters long and 15 centimeters in diameter. Each core piece weighed about 4.3 grams, with the total weight of the core pieces being about 2600 grams. The barrel was then immersed and rotated in several successive cleaning baths, namely 15 minutes in a hot detergent, 2 minutes in hot water, 2 minutes in cold water, another 2 minutes in different cold water, 4 minutes in 10% HCl, and 2 minutes in cold water.

The barrel was then placed in an electroplating bath of approximately 150 liters of nickel sulphamate electrolyte containing 79.1 g.p.l. nickel, 1.34 g.p.l. chloride ions and 24.5 g.p.l. borate ions. The solution had a pH of 4.0 and was maintained at a temperature of 49° C. Four anode baskets of titanium mesh were immersed in the plating bath, each basket containing approximately 9000 grams of nickel anodes in briquette form. The D.C. supply provided a voltage of 6 volts between the anodes and cathodes, with a current of 30 amps. The electroplating operation was continued for 18 hours, during which time the barrel was rotated at 6 r.p.m.

After the plating operation, the barrel was removed from the plating bath, and subjected to a cold rinse for 2 minutes and a hot rinse for 2 minutes. The nickel clad core pieces were then removed from the barrel, and dried in hot air.

The dimensions of a typical core piece and nickel clad core piece are given in the following Table.

| Dimensions of Core Piece (mm) | | Thickness of nickel layer (mm) | | Amount of Nickel Deposited (as wt % of total wt. of core piece and nickel cladding) |
|---|---|---|---|---|
| diameter | thickness | on faces | on edges | |
| 23.454 | 1.249 | 0.072 | 0.278 | 20.9 |

Finally, the nickel clad core pieces were annealed in a furnace at 990° C. for 17 minutes in a hydrogen atmosphere.

Various other embodiments and specific examples within the scope of the invention will be apparent to a person skilled in the art, the scope of the invention being defined in the appended claims.

What we claim as new and desire to protect by Letters Patent of the United States

1. A process for the production of coin blanks suitable for minting into coins, including providing metallic core pieces, each core piece having opposed, substantially planar faces and a common side edge, loading said core pieces into a perforated container, placing the container in an electroplating bath, electroplating a metallic cladding on the core pieces, while moving the container angularly about a horizontal axis, until the metallic cladding has a thickness of at least about 0.05 mm on each face of each core piece and a thickness of at least 2 to 4 times the face thickness on the side edge of each core piece, removing the cladded core piece from the container, and heating the cladded core pieces to produce a metallurgical bond between the metallic cladding and core piece of each cladded core piece and to decrease their hardness to less than about 65 on the Rockwell 30T hardness scale.

2. A process according to claim 1 including producing raised rims around the faces of the core pieces before loading the core pieces into the perforated container.

3. A process according to claim 1 wherein the core pieces are of low carbon steel.

4. A process according to claim 1 wherein the metallic cladding is a nickel cladding.

5. A process according to claim 1 wherein the metallic cladding is a nickel cladding and the core pieces are of low carbon steel.

6. A process for the production of coin blanks suitable for minting into coins, including providing core pieces of low carbon steel, each core piece having opposed, substantially planar faces and a common side edge, each core piece also having raised rims around the faces, loading said core pieces into a perforated container, placing the container in a nickel electroplating bath, electroplating a nickel cladding on the core pieces while moving the container angularly about a horizontal axis, until the nickel cladding has a thickness of at least about 0.05 mm on each face of each core piece and a thickness of at least 2 to 4 times the face thickness on the side edge of each core piece, removing the nickel cladded core pieces from the container, and heating the nickel cladded core pieces to produce a metallurgical bond between the nickel cladding and core piece of each nickel cladded core piece and to decrease their hardness to less than about 65 on the Rockwell 30T hardness scale.

* * * * *